United States Patent Office.

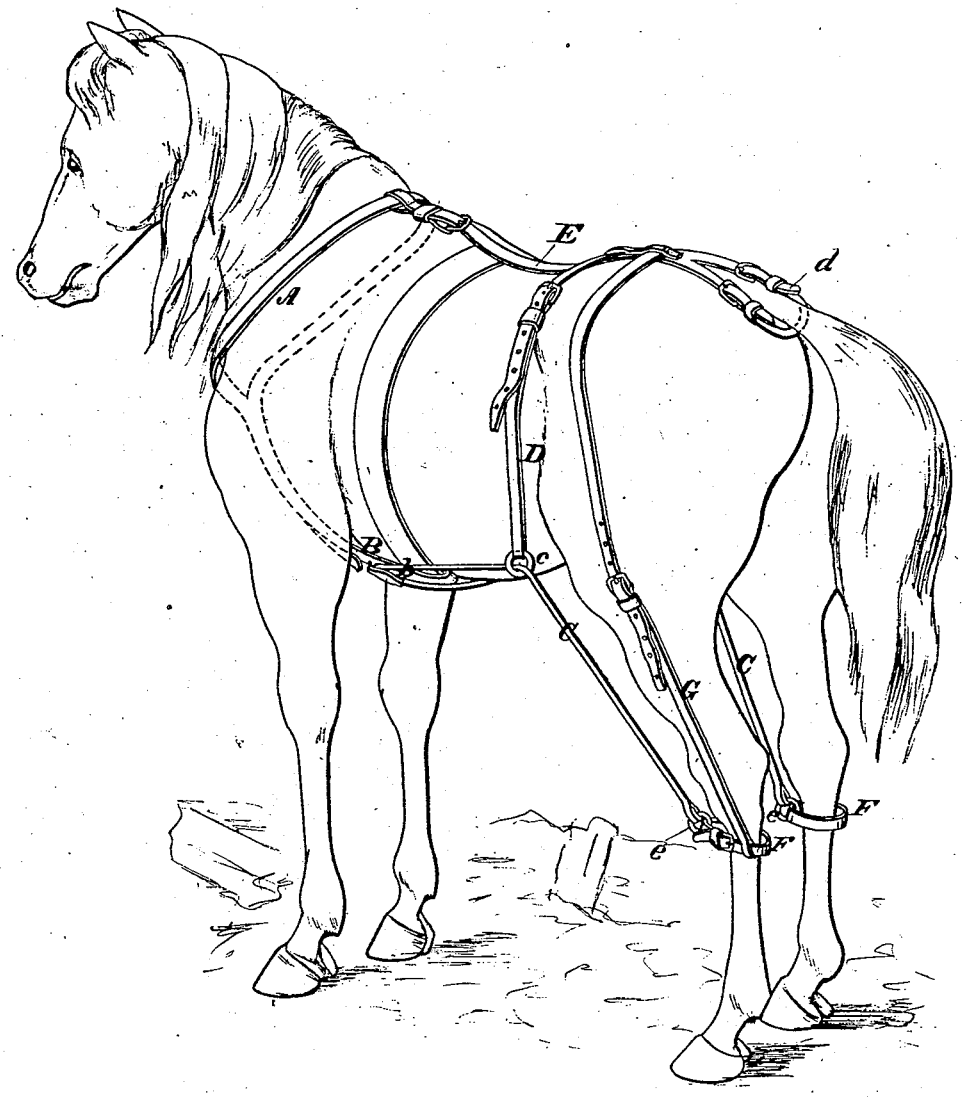

S. L. GRAY, OF CHILLICOTHE, OHIO.

Letters Patent No. 78,082, dated May 19, 1868.

---

IMPROVEMENT IN HARNESS FOR VICIOUS HORSES.

---

*The Schedule referred to in these Letters Patent and making part of the same.*

---

TO ALL WHOM IT MAY CONCERN:

Be it known that I, S. L. GRAY, of Chillicothe, in the county of Ross, and State of Ohio, have invented a new and improved Harness for Vicious Horses; and I do hereby declare that the following is a full, clear, and exact description thereof, which will enable those skilled in the art to make and use the same, reference being had to the accompanying drawings, forming part of this specification.

This invention relates to a new and improved harness for controlling vicious horses, the parts being constructed, arranged, and applied to the horse in such a manner that the latter will be entirely within the power of the driver or rider.

The drawing represents a perspective view of my invention applied to a horse.

A represents a strap, which passes around the neck of the animal, and extends between the fore legs, and has a strap, B, attached, with a loop, a, at its end, for a surcingle to pass through.

The strap B has a pulley, b, firmly secured to it, around which a strap, C, passes. This strap C may be of cylindrical form—round; that shape would be preferable—and it is supported at each side of the horse by passing through rings c c at the lower ends of a strap, D, which passes through a breeching or back-strap, E, the front end of the latter being attached to the top of strap A, and the rear end provided with the usual crupper, d. The ends of the strap C are attached, by rings e e, to straps F F, which are fitted on the hind legs of the horse, as shown in the drawing, and the straps F F are retained in position on the horse's legs by means of a strap, G, which passes over the rump of the horse and through the back-strap E.

By this means a horse is prevented from kicking or rearing, and also from running away. He is under the complete control of the driver, and may be managed without any trouble or difficulty whatever.

The parts above described are applied to an ordinary harness at a very moderate expense, some parts being common to both, as, for instance, the back-strap E and the neck-strap A, which may serve as a breast-collar.

Harnesses provided with a stuffed collar may have the strap E attached to its top, and the strap B attached to its lower end.

By means of the strap D, the strap C is held up while the horse is moving, for the purpose of preventing his feet from becoming entangled in said strap C.

I claim as new, and desire to secure by Letters Patent—

The strap D and rings c, in combination with the strap C, pulley b, and straps F F, as herein described, for the purpose specified.

S. L. GRAY.

Witnesses:
SOLOMON KERNEY,
WASHINGTON McMASTER.